US009936535B2

(12) United States Patent
Mihira (10) Patent No.: US 9,936,535 B2
(45) Date of Patent: Apr. 3, 2018

(54) COMMUNICATION APPARATUS AND CONTROL METHOD FOR COMMUNICATION APPARATUS (71) Applicant: CANON KABUSHIKI KAISHA, Tokyo (JP)

(72) Inventor: Yoshiro Mihira, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/462,052

(22) Filed: Mar. 17, 2017

(65) Prior Publication Data
US 2017/0280502 A1 Sep. 28, 2017

(30) Foreign Application Priority Data

Mar. 24, 2016 (JP) .................................. 2016-060642

(51) Int. Cl.
H04B 7/00 (2006.01)
H04W 76/06 (2009.01)
H04W 4/00 (2018.01)
H04L 29/12 (2006.01)
H04W 84/12 (2009.01)

(52) U.S. Cl.
CPC ....... *H04W 76/066* (2013.01); *H04L 61/6081* (2013.01); *H04W 4/008* (2013.01); *H04W 84/12* (2013.01)

(58) Field of Classification Search
CPC .. H04W 76/066; H04W 4/008; H04L 61/6081
USPC ......................................................... 455/41.3
See application file for complete search history.

(56) References Cited

U.S. PATENT DOCUMENTS

| 2003/0002898 | A1* | 1/2003 | Kimura | H04N 1/00188 400/76 |
| 2006/0114499 | A1* | 6/2006 | Sumita | H04W 28/18 358/1.15 |
| 2007/0076875 | A1* | 4/2007 | Kaechi | H04L 63/08 380/247 |
| 2013/0057908 | A1* | 3/2013 | Park | H04L 61/2015 358/1.15 |
| 2016/0366289 | A1* | 12/2016 | Kitamura | G06F 3/1236 |
| 2017/0054795 | A1* | 2/2017 | Inoue | H04L 67/10 |

FOREIGN PATENT DOCUMENTS

JP 2014-165593 A 9/2014

* cited by examiner

Primary Examiner — Sanh Phu
(74) Attorney, Agent, or Firm — Canon U.S.A., Inc. IP Division (57) ABSTRACT In a case where wireless connection to a device fails because the number of terminals in wireless connection with the device has reached a maximum number, a communication apparatus instructs the device to stop operating in a direct wireless communication mode.

12 Claims, 9 Drawing Sheets

500 SETTING SCREEN

FIG.5B

510 WIRELESS CONNECTION SCREEN

FIG.5C

520 WIRELESS CONNECTION SCREEN

FIG.6A

600 SEARCH SCREEN

FIG.6B

610 SEARCH PROGRESS SCREEN

FIG.6C

620 SEARCH RESULT SCREEN

FIG.8A
800 CONNECTION SUCCEEDED SCREEN

FIG.8B
810 CONFIRMATION SCREEN

FIG.8C
820 CONNECTION FAILED SCREEN

COMMUNICATION APPARATUS AND CONTROL METHOD FOR COMMUNICATION APPARATUS

BACKGROUND

Field

The present disclosure relates to a communication apparatus and a control method for a communication apparatus.

Description of the Related Art

Communication apparatuses (e.g., smartphones) including a wireless local area network (LAN) function can perform wireless communication with another device by establishing a wireless connection with an access point to facilitate the wireless communication.

In another known technique, a communication apparatus can directly establish a wireless connection with a device, without a relay apparatus such as an access point.

More specifically, a device operates in a direct wireless communication mode, such as a software access point mode or Wi-Fi Direct®, and the communication apparatus establishes wireless connection with the device operating in the direct wireless communication mode. Japanese Patent Application Laid-Open No. 2014-165593 discusses a technique for causing a printing apparatus to operate in a direct wireless communication mode, and directly and wirelessly connecting a mobile terminal to the printing apparatus operating in the direct wireless communication mode.

A maximum number is set for the number of terminals that can simultaneously be in wireless connection with the device operating in the direct wireless communication mode. Thus, a user's attempt to establish wireless connection between the user's communication device and the device operating in the direct wireless communication mode can fail because the number of terminals in wireless connection with the device has reached the maximum number. In such a case, the user needs to operate the device in such a manner that the device stops operating in the direct wireless communication mode, and then operate the device again in such a manner that the device starts operating in the direct wireless communication mode.

The user may not necessarily be comfortable operating the device operating in the direct wireless communication mode. A user who is not comfortable probably does not know, in a case where the number of terminals in wireless connection with the device has reached the maximum number, how to establish wireless connection between the user's communication apparatus and the device.

SUMMARY OF THE INVENTION

A communication apparatus includes an inquiry unit configured to inquire, in a case where the communication apparatus receives, from a user, an instruction to establish wireless connection with a printing apparatus operating in a direct wireless communication mode, with the printing apparatus whether a number of terminals in the wireless connection with the printing apparatus has reached a maximum number, through Bluetooth® Low Energy communication, a first instruction unit configured to instruct, in a case where it is determined, based on a result of the inquiry by the inquiry unit, that the number of terminals in the wireless connection with the printing apparatus has reached the maximum number, the printing apparatus to stop operating in the direct wireless communication mode through Bluetooth® Low Energy communication, and a second instruction unit configured to instruct, after the instruction by the first instruction unit, the printing apparatus to start operating in the direct wireless communication mode, through the Bluetooth® Low Energy communication.

Further features will become apparent from the following description of exemplary embodiments with reference to the attached drawings.

DESCRIPTION OF THE EMBODIMENTS

Exemplary embodiments will be described with reference to the accompanying drawings. The exemplary embodiments described below are not intended to be limiting. Not all of the combinations of features described in the exemplary embodiments are required for implementing the features of the exemplary embodiments.

A first exemplary embodiment is described below. An overview of a communication system according to a first exemplary embodiment will be described with reference to FIG. 1. The communication system includes a mobile terminal 100 and a printing apparatus 110, each including a wireless local area network (LAN) function. The printing apparatus 110 can operate in a direct wireless communication mode. The mobile terminal 100 establishes wireless connection with the printing apparatus 110 operating in the direct wireless communication mode, and then performs Wi-Fi® communications with the printing apparatus 110.

Figure 1:
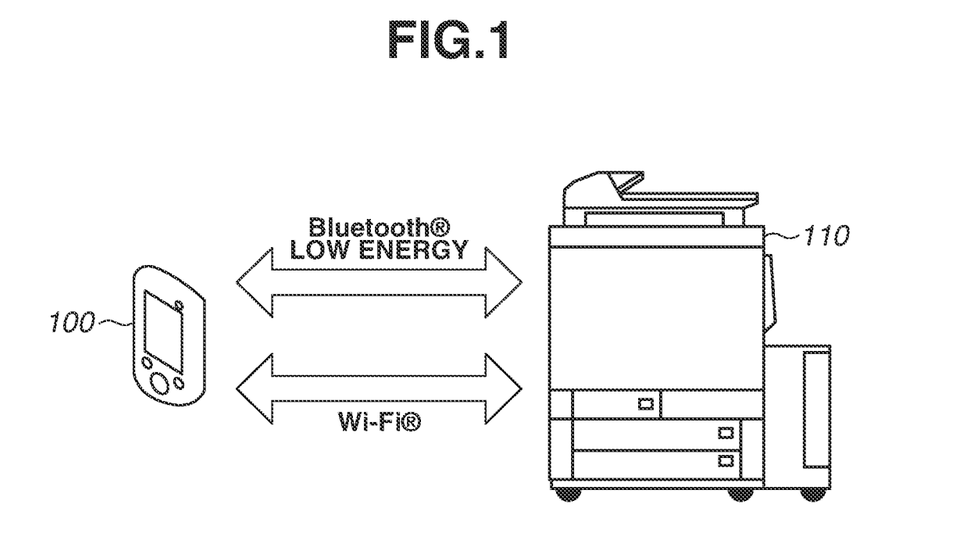
FIG. 1 is a diagram illustrating a configuration of a communication system.

The mobile terminal 100 and the printing apparatus 110 each include a Bluetooth® function, and thus can perform communications based on Bluetooth® Low Energy with each other.

The mobile terminal 100 according to the present exemplary embodiment can instruct the printing apparatus 110 to start or stop operating in the direct wireless communication mode through the Bluetooth® Low Energy communications. In particular, in the present exemplary embodiment, the mobile terminal 100 instructs the printing apparatus 110 to stop operating in the direct wireless communication mode through the Bluetooth® Low Energy communication in a case where the number of terminals in wireless connection with the printing apparatus 110, operating in the direct wireless communication mode, has reached a maximum number. The mobile terminal 100 then instructs the printing apparatus 110 to start operating in the direct wireless communication mode, and establishes wireless connection with the printing apparatus 110 operating in the direct wireless communication mode.

Figure 2:
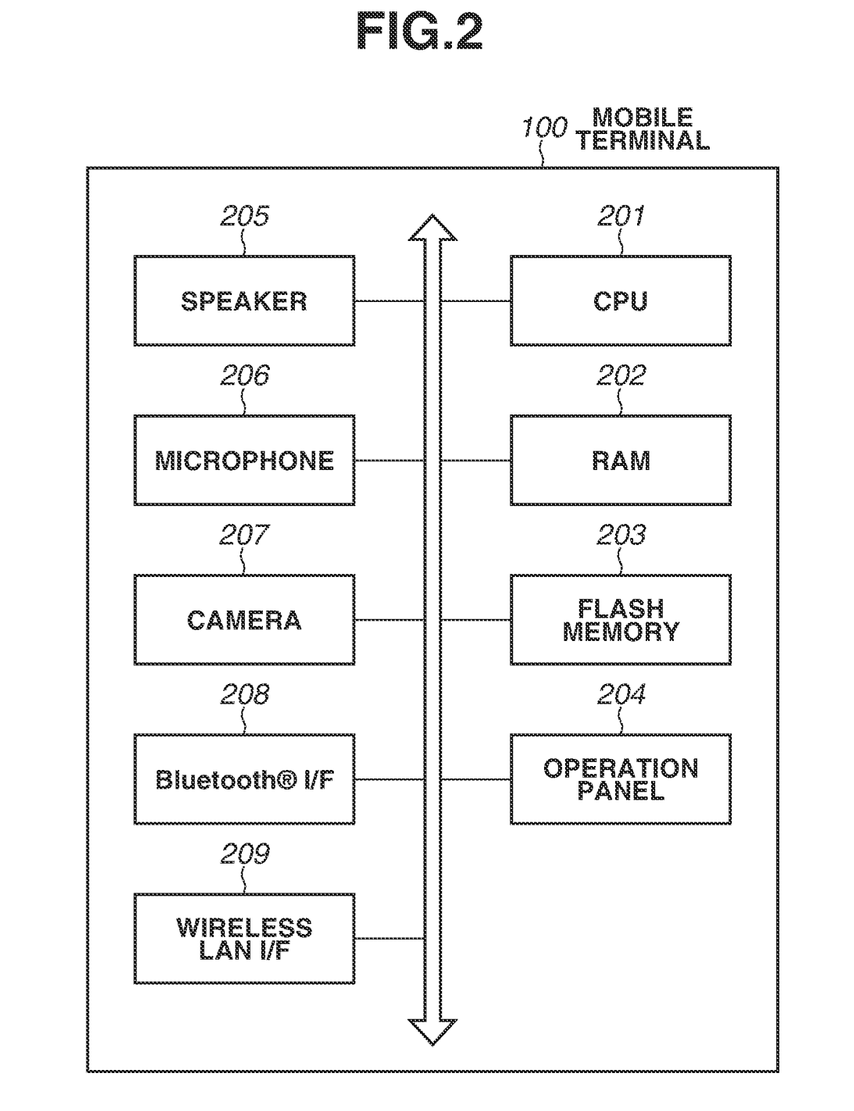
FIG. 2 is a diagram illustrating a hardware configuration of a mobile terminal.

Next, a hardware configuration of the mobile terminal 100 is described with reference to FIG. 2. An example of the mobile terminal 100 according to the present exemplary embodiment is a smartphone. However, any another communication apparatus including the wireless LAN function and/or the Bluetooth® function is applicable.

A central processing unit (CPU) 201 reads a control program stored in a flash memory 203, and executes various types of processing for controlling the operation of the mobile terminal 100. A random access memory (RAM) 202 is used as a temporarily storage area, such as a main memory and a work area, by the CPU 201. The flash memory 203 is a nonvolatile storage medium storing therein control programs for the mobile terminal 100 and various types of data, such as a digital images or digital documents.

The mobile terminal 100 according to the present exemplary embodiment includes a single CPU 201 executing each process in the flowcharts described below, but can include other configurations. For example, a plurality of CPUs can cooperate to execute each process illustrated in the flowcharts described below. The processes in the flowcharts described below can also be partially executed by a hardware circuit, such as an application specific integrated circuit (ASIC).

An operation panel 204 includes a touch panel function that detects a touch operation of the user and displays various screens. The user can input a desired operation instruction to the mobile terminal 100 through the touch operation on the operation panel 204. The mobile terminal 100 includes hardware keys (not illustrated), enabling the user to input the operation instruction to the mobile terminal 100 using the hardware keys.

A speaker 205 and a microphone 206 are used by the user to, for example, make a phone call. The camera 207 captures an image in response to an image capturing instruction from the user. An image captured with the camera 207 is stored in a predetermined area in the flash memory 203.

A Bluetooth® I/F 208 performs wireless communications through Bluetooth®. The Bluetooth® I/F 208 supports Bluetooth® Low Energy and executes the Bluetooth® Low Energy communications. A wireless LAN I/F 209 includes a wireless LAN function, and executes wireless communications based on a Wi-Fi® standard, such as Institute of Electrical and Electronics Engineers (IEEE) 802.11a/b/g/n/ac.

Figure 3:
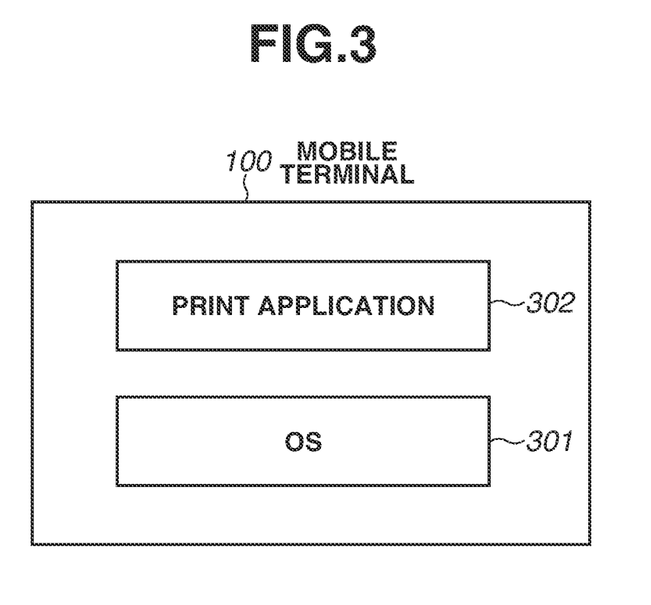
FIG. 3 is a diagram illustrating a software configuration of the mobile terminal.

A software configuration of the mobile terminal 100 is described with reference to FIG. 3. FIG. 3 is a block diagram illustrating functions to be implemented by the CPU 201 executing the control program stored in the flash memory 203.

An operating system (OS) 301 is software for controlling an operation of the mobile terminal 100. Various applications, including a print application 302 described below, can be installed in the mobile terminal 100. The OS 301 controls the operation of the mobile terminal 100 in accordance with an instruction received from each application and the operation instruction input by the user through the operation panel 204.

A print application 302 provides a printing function to the user. The print application 302 instructs the OS 301 to, for example, search for a printing apparatus, generate print data, and transmit the generated print data.

Various applications other the print application 302 are installed in the mobile terminal 100, but will not be described.

Figure 4:
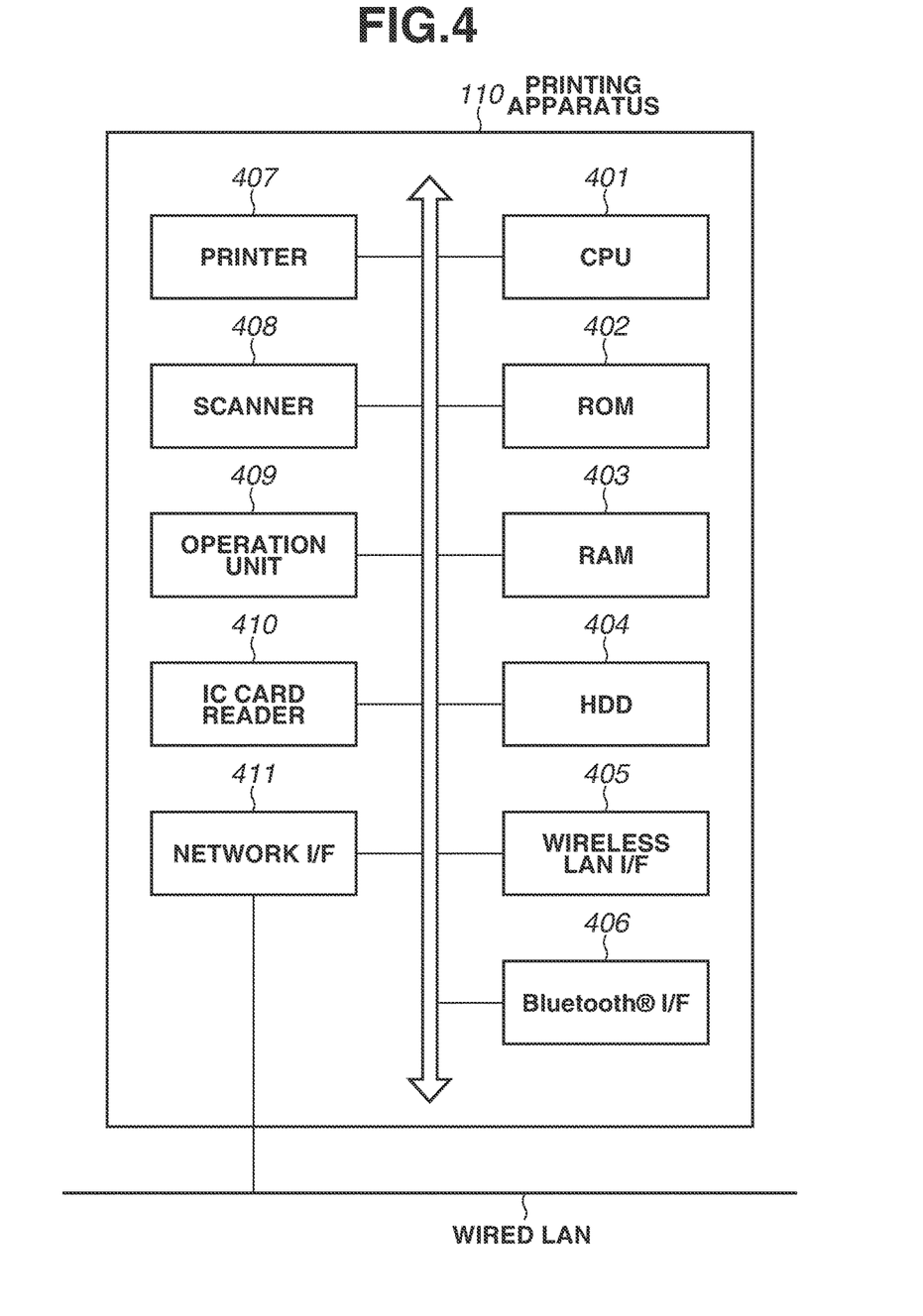
FIG. 4 is a diagram illustrating a hardware configuration of a printing apparatus.

Next, a hardware configuration of the printing apparatus 110 is described with reference to FIG. 4.

A CPU 401 reads a control program stored in a read only memory (ROM) 402, and executes various types of processing for controlling the operation of the printing apparatus 110. The ROM 402 stores the control program. A RAM 403 is used as a temporarily storage area, such as a main memory and a work area, by the CPU 401. A hard disk drive (HDD) 404 is a nonvolatile storage medium storing therein various types of data.

A wireless LAN I/F 405 includes a wireless LAN function, and executes wireless communications based on a Wi-Fi® standard, such as IEEE 802.11a/b/g/n/ac. The wireless LAN I/F 405 can operate in a direct wireless communication mode. When the wireless LAN I/F 405 operates in the direct wireless communication mode, the printing apparatus 110 generates a service set identifier (SSID) and a connection key (security key), and serves as an access point. The mobile terminal 100 that has established wireless connection with the access point indicated by the SSID generated by the printing apparatus 110 can perform direct wireless communications between the mobile terminal 100 and the printing apparatus 110. The direct wireless communication mode, which is assumed to be a software access point mode in the present exemplary embodiment, can be based on other communication schemes (e.g., Wi-Fi Direct®).

A Bluetooth® I/F 406 performs wireless communications through Bluetooth®. The Bluetooth® I/F 406 supports Bluetooth® Low Energy and performs the Bluetooth® Low Energy communication. A network I/F 411 communicates with an external apparatus (e.g., a personal computer (PC)) on a wired LAN.

A printer 407 executes print processing on a sheet based on print data received by the wireless LAN I/F 405 and the network I/F 411. A scanner 408 reads a document, and generates a document image. The document image generated by the scanner 408 is printed by the printer 407 (copy processing) or stored in the HDD 404.

An operation unit 409 includes a liquid crystal display unit including a touch panel function and a keyboard, and displays various operation screens. The user can input an instruction and information to the printing apparatus 110 through the operation unit 409. An integrated circuit (IC) card reader 410 reads user information from an IC card. The printing apparatus 110 executes authentication processing using the user information read by the IC card reader 410.

Figure 5A:
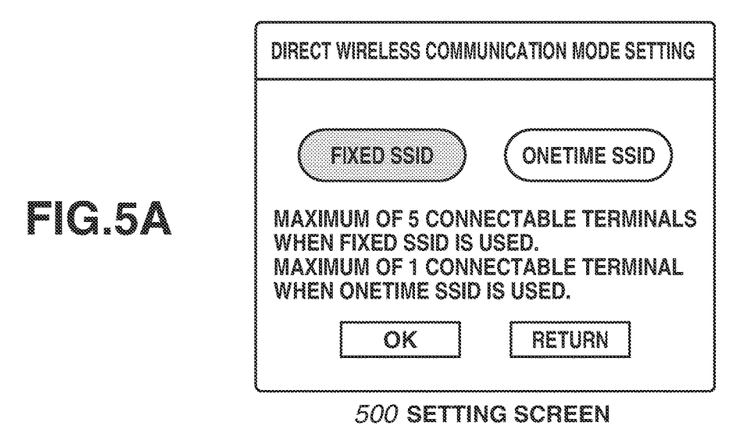
FIGS. 5A, 5B, and 5C are diagrams each illustrating a screen displayed by the printing apparatus.

Additional features of the direct wireless communication mode of the printing apparatus 110 are described with reference to FIGS. 5A, 5B, and 5C. A setting screen 500 illustrated in FIG. 5A is a screen for setting an SSID type to be used in the direct wireless communication mode, and is displayed by the operation unit 409 of the printing apparatus 110. In the present exemplary embodiment, two SSID types, including a fixed SSID and a onetime SSID, are available. The user selects either the fixed SSID or the onetime SSID as the SSID to be used in the direct wireless communication mode. In the setting screen 500, the fixed SSID is selected.

The fixed SSID is a setting in which the same SSID is generated every time the printing apparatus 110 operates in the direct wireless communication mode. The SSID to be generated as the fixed SSIS is set by the user in advance in the printing apparatus 110 through a setting screen (not illustrated). When the fixed SSID is used in the direct wireless communication mode in the present exemplary embodiment, a maximum number of terminals that can be in wireless connection with the printing apparatus 110 operating in the direct wireless communication mode is five. This number is provided for example purposes, and any other maximum number can be employed.

The onetime SSID is a setting in which a different SSID is generated every time the printing apparatus 110 operates in the direct wireless communication mode. Methods for generating a different SSID include a known method for generating random characters, but other applicable methods can be employed. In the present exemplary embodiment, in a case where the onetime SSID is used in the direct wireless communication mode, a maximum number of terminals that can be in wireless connection with the printing apparatus 110 operating in the direct wireless communication mode is one. This number is provided for example purposes, and any other maximum number can be employed.

Figure 5B:
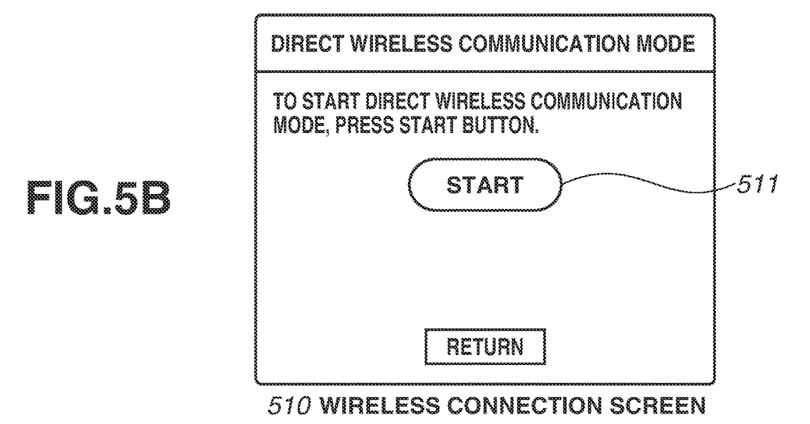
Figure 5C:
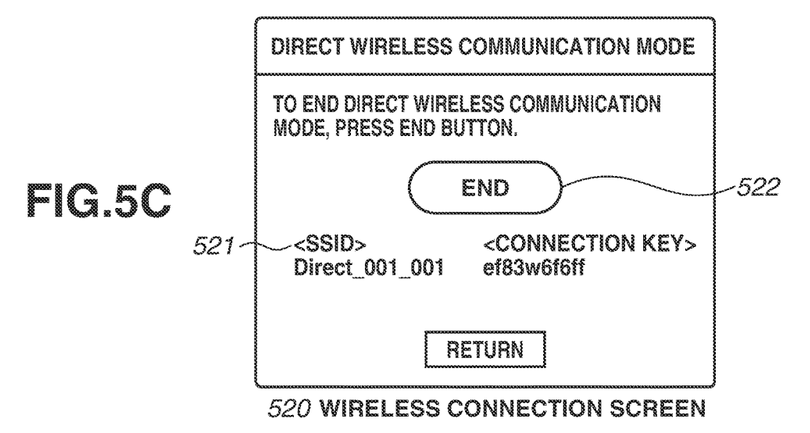

A wireless connection screen 510 illustrated in FIG. 5B is a screen for causing the printing apparatus 110 to operate in the direct wireless communication mode, and is displayed by the operation unit 409 of the printing apparatus 110. A user presses a start button 511 to cause the printing apparatus 110 to operate in the direct wireless communication mode. When the start button 511 is pressed, the printing apparatus 110 begins operating in the direct wireless communication mode, and generates an SSID and a connection key. The SSID generated here is either the fixed SSID or the onetime SSID, depending on the selection on the setting screen 500. The operation unit 409 of the printing apparatus 110 displays a wireless connection screen 520 illustrated in FIG. 5C.

The SSID and the connection key generated by the printing apparatus 110 are displayed in an item 521 on the wireless connection screen 520. The user wirelessly connects the user's mobile terminal to the printing apparatus 110 with the SSID and the connection key displayed on the wireless connection screen 520. An end button 522 is pressed to cause the printing apparatus 110 to stop operating in the direct wireless communication mode. When the end button 522 is pressed, the printing apparatus 110 stops operating in the direct wireless communication mode. When the printing apparatus 110 stops operating in the direct wireless communication mode, the wireless connection between the terminals and the printing apparatus 110 is disconnected.

In the configuration described above with reference to FIGS. 5B and 5C, the user presses the start button 511 and the end button 522, displayed by the printing apparatus 110, to cause the printing apparatus 110 to start and stop operating in the direct wireless communication mode. In the present exemplary embodiment, the mobile terminal 100 can instruct the printing apparatus 110 to start and stop operating in the direct wireless communication mode through the Bluetooth® Low Energy communications, as will be described in detail below with reference to FIG. 7.

Processing of establishing wireless connection between the mobile terminal 100 and the printing apparatus 110 operating in the direct wireless communication mode will now be described. In the present exemplary embodiment, the user searches for a nearby device with the mobile terminal 100, and selects a device (printing apparatus 110) to which the user wishes to wirelessly connect from among a plurality of discovered devices. This processing is described with reference to FIGS. 6A, 6B, and 6C.

Figure 6A:
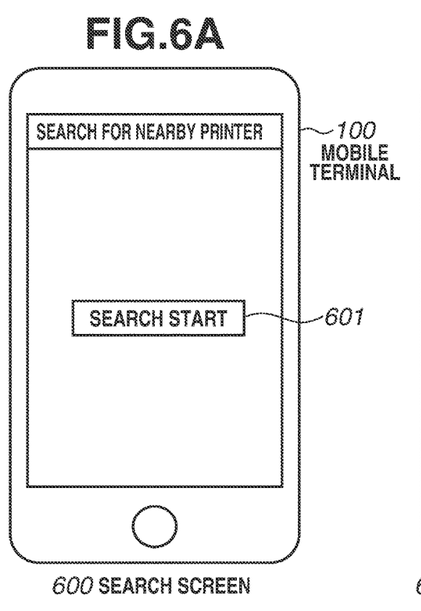
FIGS. 6A, 6B, and 6C are diagrams each illustrating a screen displayed by the mobile terminal.
Figure 6B:
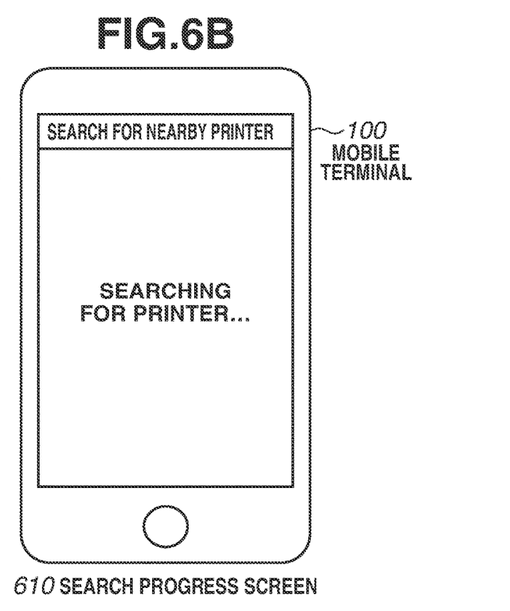

A search screen 600 illustrated in FIG. 6A is displayed on the operation panel 204 of the mobile terminal 100, and is provided by the print application 302. The search screen 600 displays a search start button 601. When the search start button 601 is pressed, the print application 302 instructs the OS 301 to execute search processing, and the OS 301 controls the mobile terminal 100 in such a manner that the search processing is executed. In the present exemplary embodiment, the devices, including the printing apparatus 110, transmit Bluetooth® Low Energy advertising packets at predetermined time intervals. The terminal 100 searches for nearby devices by receiving the advertising packet. The operation panel 204 of the mobile terminal 100 displays a search progress screen 610 illustrated in FIG. 6B, while the mobile terminal 100 is performing the search processing. The search progress screen 610 is provided by the print application 302.

Figure 6C:
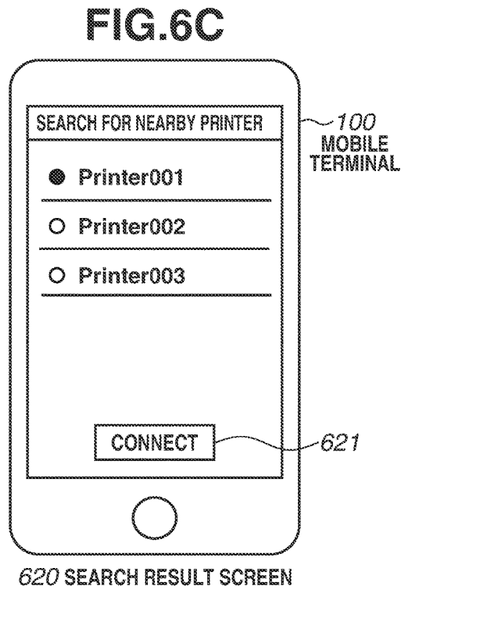

Upon completion of the search processing, the operation panel 204 of the mobile terminal 100 displays a search result screen 620 illustrated in FIG. 6C. The search result screen 620 is provided by the print application 302. In the present exemplary embodiment, the print application 302 determines that the search processing has completed when a predetermined period of time (e.g., 10 seconds) elapses after the search processing begins.

The search result screen 620 displays devices discovered by the search processing. In the example illustrated in the search result screen 620, three devices were discovered through the search processing. The Bluetooth® Low Energy advertising packet includes a model name, which is displayed as identification information of the device on the search result screen 620. In the present exemplary embodiment, the device that transmitted an advertising packet received by the mobile terminal 100 with a field intensity weaker than a predetermined threshold is regarded as a device remote from the mobile terminal 100, and is not displayed on the search result screen 620. In other words, only devices in proximity to the mobile terminal 100 are displayed on the search result screen 620. The devices can be displayed on the search result screen 620 in an ascending order of distance to the mobile terminal 100.

The user can select a desired device on the search result screen 620. The search result screen 620 illustrates a state where "Printer001" is selected by the user. In response to the user pressing a connect button 621 to select the desired device, the mobile terminal 100 determines that an instruction to establish wireless connection with the device is received, and starts connection processing illustrated in FIG. 7.

Figure 7:
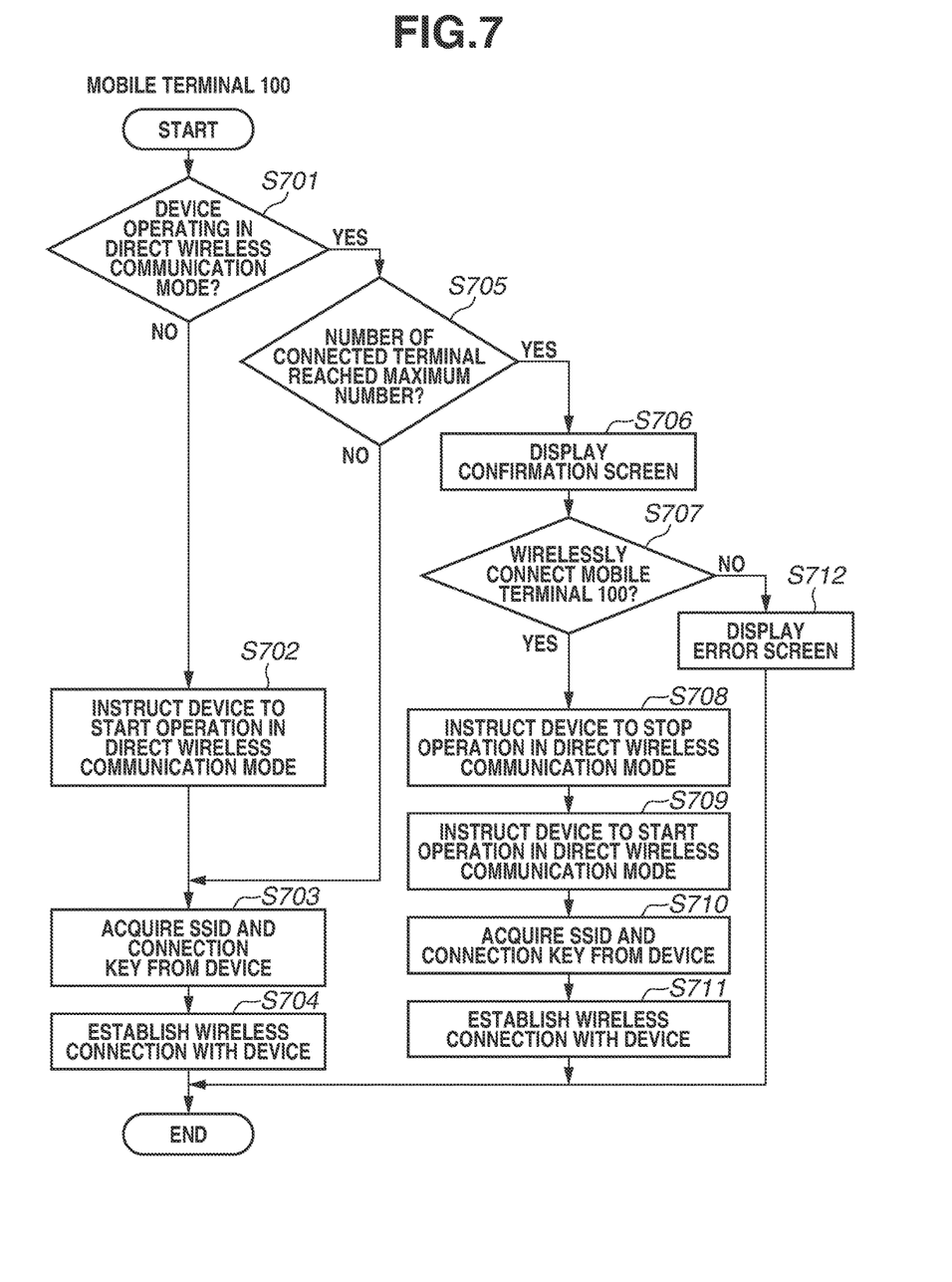
FIG. 7 is a flowchart illustrating processing executed by the mobile terminal.

The connection processing executed by the mobile terminal 100 to establish connection with the device is described with reference to a flowchart in FIG. 7. Steps in the flowchart in FIG. 7 are implemented by the CPU 201 loading a control program stored in a memory, such as the flash memory 203, into the RAM 202 and executing the program. The mobile terminal 100 can be configured in such a manner that at least a part of the steps in the flowchart in FIG. 7 is executed by the CPU 201, and the remaining steps are executed by a CPU (not illustrated) other than the CPU 201. The processing illustrated in the flowchart in FIG. 7 is executed when the user presses the connect button 621 on the search result screen 620 to select a desired device, that is, when the instruction to establish wireless connection with the device is received.

In step S701, the print application 302 determines whether the device selected by the user on the search result screen 620 is operating in the direct wireless communication mode. In step S701, the print application 302 inquires, through GATT communication as the Bluetooth® Low Energy communication, with the selected device whether the device is operating in the direct wireless communication mode. The print application 302 then determines, based on a response from the device to the inquiry, whether the device is operating in the direct wireless communication mode. It is assumed in the description below that the user has selected the printing apparatus 110 on the search result screen 620.

The processing in step S701 is described in more detail. In step S701, the print application 302 instructs the OS 301 to inquire with the printing apparatus 110 whether the printing apparatus 110 is operating in the direct wireless communication mode. The OS 301 controls the Bluetooth® I/F 208 so as to inquire with the printing apparatus 110 whether the printing apparatus 110 is operating in the direct wireless communication mode. Thus, the Bluetooth® I/F 208 issues the inquiry through the GATT communication. In response to the Bluetooth® I/F 208 receiving, from the printing apparatus 110, a response to the inquiry, the response is transferred to the print application 302 to be checked by the print application 302.

If the response to the inquiry from the printing apparatus 110 indicates that the printing apparatus 110 is not operating in the direct wireless communication mode (No, in step S701), the processing proceeds to step S702. If the response to the inquiry from the printing apparatus 110 indicates that the printing apparatus 110 is operating in the direct wireless communication mode (YES in step S701), the processing proceeds to step S705. The processing in step S701 described above is implemented by the CPU 201.

In step S702, the print application 302 instructs the printing apparatus 110 to start operating in the direct wireless communication mode. More specifically, the print application 302 instructs the OS 301 to instruct the printing apparatus 110 to start operating in the direct wireless communication mode. Under the control of the OS 301, the Bluetooth® I/F 208 instructs, through the GATT communication, the printing apparatus 110 to start operating in the direct wireless communication mode. The printing apparatus 110 receiving the instruction starts operating in the direct wireless communication mode, and generates the SSID and the connection key to be used in the direct wireless communication mode. The processing in step S702 described above is implemented by the CPU 201.

In step S703, the print application 302 acquires the SSID and the connection key from the printing apparatus 110. More specifically, the print application 302 instructs the OS 301 to acquire the SSID and the connection key from the printing apparatus 110. Under the control of the OS 301, the Bluetooth® I/F 208 acquires, through the GATT communications, the SSID and the connection key from the printing apparatus 110. The SSID and the connection key acquired by the Bluetooth® I/F 208 are transferred to the print application 302. The processing in step S703 described above is implemented by the CPU 201.

In step S704, the print application 302 establishes wireless connection with the printing apparatus 110 using the acquired SSID and the connection key. More specifically, the print application 302 instructs the OS 301 to establish wireless connection with the printing apparatus 110 using the acquired SSID and the connection key. Under the control of the OS 301, the wireless LAN I/F 209 establishes the wireless connection with the printing apparatus 110. The processing in step S704 described above is implemented by the CPU 201.

Figure 8A:
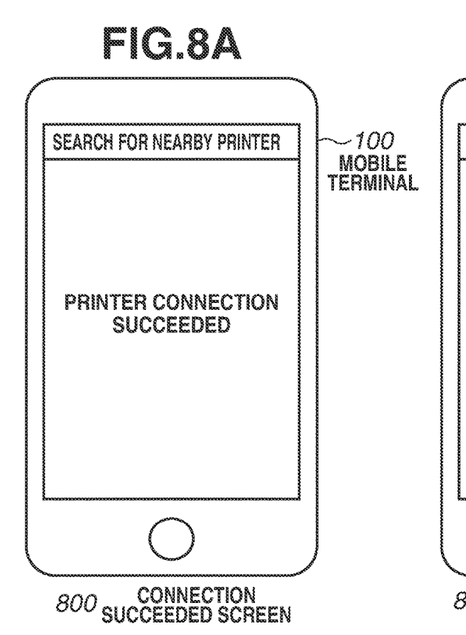
FIGS. 8A, 8B, and 8C are diagrams each illustrating a screen displayed by the mobile terminal.

Through the processing in step S704, the mobile terminal 100 establishes the wireless connection with the printing apparatus 110 operating in the direct wireless communication mode. A connection succeeded screen 800 illustrated in FIG. 8A is displayed on the operation panel 204 of the mobile terminal 100 when the mobile terminal 100 establishes the wireless connection with the printing apparatus 110. The connection succeeded screen 800 is provided by the print application 302.

Next, step S705 is described. In a case where the printing apparatus 110 is determined to be operating in the direct wireless communication mode in the processing in step S701, the processing in step S705 is executed. In step S705, the print application 302 determines whether the number of terminals in wireless connection with the printing apparatus 110 has reached a maximum number. More specifically, the print application 302 instructs the OS 301 to inquire with the printing apparatus 110 whether the number of terminals in wireless connection with the printing apparatus 110 has reached the maximum number. Under the control of the OS 301, the Bluetooth® I/F 208 inquires, through the GATT communications, with the printing apparatus 110 whether the number of terminals in wireless connection with the printing apparatus 110 has reached the maximum number.

In response to the Bluetooth® I/F 208 receiving a response to the inquiry from the printing apparatus 110, the response is transferred to the print application 302 to be checked by the print application 302. In a case where the response to the inquiry from the printing apparatus 110 indicates that the number of terminals in wireless connection with the printing apparatus 110 has not reached the maximum number (No, in step S705), the processing proceeds to step S703. Based on the processing in step S703 and S704, the mobile terminal 100 establishes the wireless connection with the printing apparatus 110 operating in the direct wireless communication mode. In a case where the response to the inquiry from the printing apparatus 110 indicates that the number of terminals in wireless connection with the printing apparatus 110 has reached the maximum number (YES in step S705), the processing proceeds to step S706. The processing in step S705 is implemented by the CPU 201.

In step S706, the print application 302 displays a confirmation screen with which a user confirms whether to connect the mobile terminal 100 to a device (printing apparatus 110). The screen displayed in this step is a confirmation screen 810 illustrated in FIG. 8B. In a case where the user wishes to establish wireless connection between the mobile terminal 100 and the printing apparatus 110 even with the number of terminals in wireless connection with the printing apparatus 110 having reached the maximum number, the operation of the printing apparatus 110 in the direct wireless communication mode needs to be temporarily stopped.

Figure 8B:
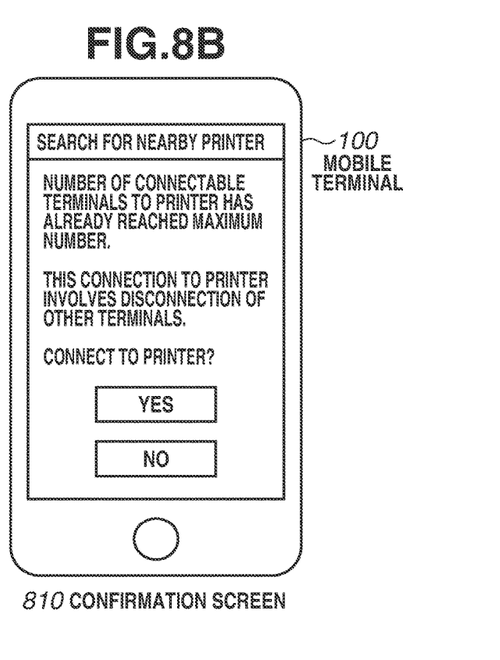

In step S707, the print application 302 determines whether to establish the wireless connection between the mobile terminal 100 and the printing apparatus 110. If the user selects "Yes" on the confirmation screen 810 (YES in step S707), the print application 302 determines that the wireless connection is to be established between the mobile terminal 100 and the printing apparatus 110, and the processing proceeds to step S708. If the user selects "No" on the confirmation screen 810 (No, in step S707), the print application 302 determines that the wireless connection is not to be established between the mobile terminal 100 and the printing apparatus 110, and the processing proceeds to step S712. The processing in step S707 described above is implemented by the CPU 201.

Figure 8C:
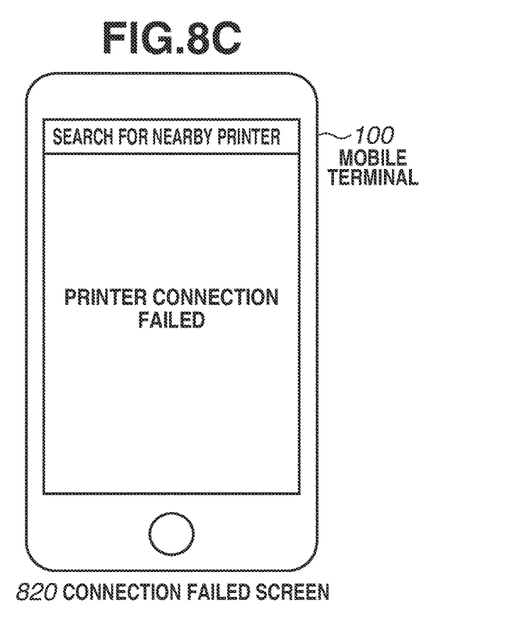

In step S712, the print application 302 displays an error screen indicating that the wireless connection to the device has failed. The screen displayed in this step is a connection failed screen 820 in FIG. 8C. The processing in step S712 described above is implemented by the CPU 201.

In step S708, the print application 302 instructs the printing apparatus 110 to stop operating in the direct wireless communication mode. More specifically, the print application 302 instructs the OS 301 to instruct the printing apparatus 110 to stop operating in the direct wireless communication mode. Under the control of the OS 301, the Bluetooth® I/F 208 instructs, through the GATT communications, the printing apparatus 110 to stop operating in the direct wireless communication mode. The printing apparatus 110 receiving the instruction stops operating in the direct wireless communication mode. With the printing apparatus 110 stopping operating in the direct wireless communication mode, the state where the number of terminals in wireless connection with the printing apparatus 110 has reached the maximum number is cancelled. The processing in step S708 described above is implemented by the CPU 201.

In step S709, the print application 302 instructs the printing apparatus 110 to start operating in the direct wireless communication mode. The processing in step S709 is similar to that in step S702 described above. Next, in step S710, the print application 302 acquires the SSID and the connection key from the printing apparatus 110. The processing in step S710 is similar to that in step S703 described above.

Next, in step S711, the print application 302 establishes the wireless connection with the printing apparatus 110 by using the SSID and the acquired connection key. The processing in step S711 is similar to that in step S704 described above.

As described above, in the present exemplary embodiment, in a case where the number of terminals in wireless connection with a device has reached a maximum number, a user can operate the user's mobile terminal to cause the device to stop operating in the direct wireless communication mode (step S708). With the device stopping operation in the direct wireless communication mode, the state where the number of terminals in wireless connection with a device has reached the maximum number can be cancelled. In this manner, the user can establish the wireless connection between a mobile terminal of the user and the device (steps S709, S710, and S711).

Next, a second exemplary embodiment as a modification of the first exemplary embodiment is described. In the first exemplary embodiment, the confirmation screen 810 in FIG. 8B is displayed regardless of the type of the SSID in a case where the number of terminals in wireless connection with the printing apparatus 110 has reached the maximum number. In a configuration described in the second exemplary embodiment, display of the confirmation screen 810 in FIG. 8B depends on the type of the SSID used in the direct wireless communication mode.

Figure 9:
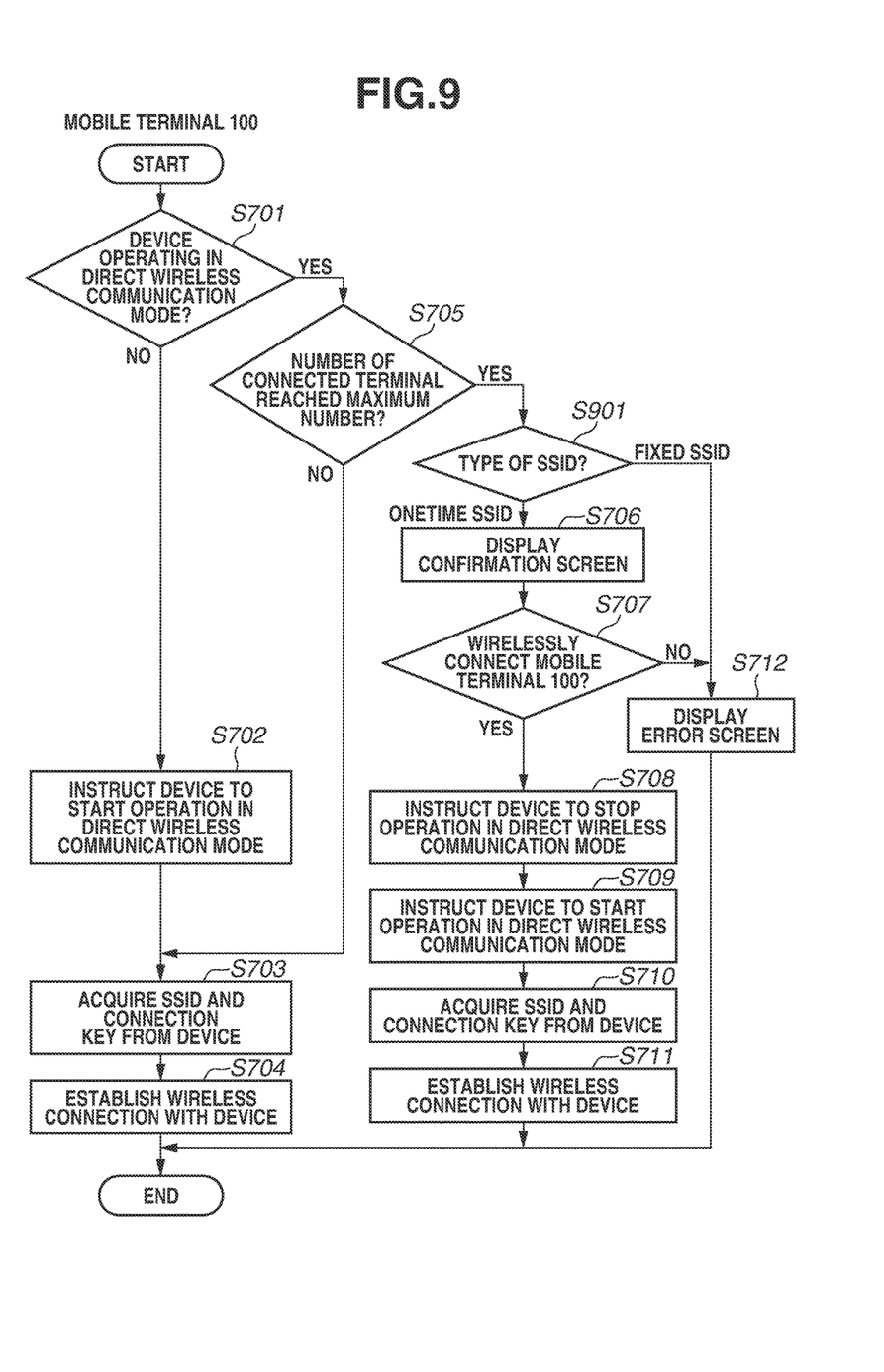
FIG. 9 is a flowchart illustrating processing executed by the mobile terminal.

FIG. 9 is a flowchart illustrating connection processing executed by the mobile terminal 100 to establish connection with a device. Steps in the flowchart in FIG. 9 are implemented by the CPU 201 loading a control program, stored in a memory, such as the flash memory 203, into the RAM 202 and executes the program. The mobile terminal 100 can be configured in such a manner that at least a part of the steps in the flowchart in FIG. 9 is executed by the CPU 201, and the remaining steps are executed by a CPU (not illustrated) other than the CPU 201. The processing illustrated in the flowchart in FIG. 9 is executed when the user selects a desired device on the search result screen 620 and presses the connect button 621. In the flowchart illustrated in FIG. 9, steps with the same reference numerals as those in FIG. 7 involve the same processing as that in FIG. 7, and thus will not be described.

In step S705, if the print application 302 determines that the number of terminals in wireless connection with the printing apparatus 110 has reached the maximum number (YES in step S705), the processing proceeds to step S901. In step S901, the print application 302 determines whether the type of the SSID used in the direct wireless communication mode is the onetime SSID or the fixed SSID. More specifically, the print application 302 instructs the OS 301 to inquire with the printing apparatus 110 what type of SSID used in the direct wireless communication mode. Under the control of the OS 301, the Bluetooth® I/F 208 inquires, through the GATT communications, with the printing apparatus 110 the type of SSID used in the direct wireless communication mode. Upon receipt of the response to the inquiry from the printing apparatus 110 by the Bluetooth® I/F 208, the response is transferred to the print application 302 to be checked by the print application 302.

If the response indicates that the type of SSID used in the direct wireless communication mode is the onetime SSID (onetime SSID in step S901), the processing proceeds to step S706. Then, in step S706, the print application 302 displays the confirmation screen 810 in FIG. 8B. If the response indicates that the type of the SSID used in the direct wireless communication mode is the fixed ID (fixed ID in step S901), the processing proceeds to step S712. In step S712, the print application 302 displays the connection failed screen 820 in FIG. 8C without displaying the confirmation screen 810 in FIG. 8B.

As described above, in the present exemplary embodiment, the display of the confirmation screen 810 illustrated in FIG. 8B depends on the type of the SSID used in the direct wireless communication mode. More specifically, the print application 302 does not display the confirmation screen 810 in a case where the SSID used in the direct wireless communication mode is the fixed SSID. In a case where the fixed SSID is used, the printing apparatus 110 generates the same SSID every time the operation in the direct wireless communication mode starts. Thus, in a case where the printing apparatus 110 temporarily stops operating in the direct wireless communication mode and then starts operating in the direct wireless communication mode again, a terminal other than the mobile terminal 100 can establish the wireless connection with the printing apparatus 110 before the mobile terminal 100 establishes the wireless connection.

Thus, the wireless connection between the mobile terminal 100 and the printing apparatus 110 is not guaranteed, so that the print application 302 does not display the confirmation screen 810 in a case where the SSID to be used in the direct wireless communication mode is the fixed SSID. In other words, the print application 302 does not instruct the printing apparatus 110 to stop operating in the direct wireless communication mode in a case where the SSID used in the direct wireless communication mode is the fixed SSID.

A third exemplary embodiment of the present invention is described below. In the above-described exemplary embodiments, it is assumed that one of the two types of SSIDs, the fixed SSID or the onetime SSID, is used in the direct wireless communication mode. The SSID used in the direct wireless communication mode is not limited to the fixed SSID and the onetime SSID, and any type of SSID can be used. For example, a user SSID can be used. The user SSID is a dedicated SSID issued to each user who has logged into the printing apparatus 110. In step S901 in FIG. 9, the user SSID can be handled in the same way as the onetime SSID or the fixed SSID.

A fourth exemplary embodiment of the present invention is described below. In the above-described exemplary embodiments, the mobile terminal 100 instructs the printing apparatus 110 to stop operating in the direct wireless communication mode, and then instructs the printing apparatus 110 to start operating in the direct wireless communication mode (step S708 and step S709). Thus, in the above-described exemplary embodiments, the instruction for stopping the operation in the direct wireless communication mode and the instruction for starting the operation in the direct wireless communication mode are separately issued. Alternatively, the instructions can be collectively issued as a single instruction. For example, the printing apparatus 110 can be instructed to restart the operation in the direct wireless communication mode instead of the processing in step S708 and S709. The printing apparatus 110 receiving the instruction to restart the operation in the direct wireless communication mode temporarily stops operating in the direct wireless communication mode, and then starts operating in the direct wireless communication mode.

Other Exemplary Embodiments

Exemplary embodiments can be implemented with processing including supplying a program for implementing one or more functions of the above-described exemplary embodiments to a system or an apparatus via a network or a storage medium, and reading and executing the program with one or more processors in the system or the apparatus. Exemplary embodiments can also be implemented by a circuit (e.g., an ASIC) implementing one or more functions.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-060642, filed Mar. 24, 2016, which is hereby incorporated by reference herein in its entirety.

What is claimed is:

1. A communication apparatus comprising:
an inquiry unit configured to inquire, in a case where the communication apparatus receives, from a user, an instruction to establish wireless connection with a printing apparatus operating in a direct wireless communication mode, with the printing apparatus whether a number of terminals in the wireless connection with the printing apparatus has reached a maximum number, through Bluetooth® Low Energy communication;
a first instruction unit configured to instruct, in a case where it is determined, based on a result of the inquiry, that the number of terminals in the wireless connection with the printing apparatus has reached the maximum number, the printing apparatus to stop operating in the direct wireless communication mode, through the Bluetooth® Low Energy communication; and
a second instruction unit configured to instruct, after the instruction by the first instruction unit, the printing apparatus to start operating in the direct wireless communication mode, through the Bluetooth® Low Energy communication.

2. The communication apparatus according to claim 1, further comprising a connection unit configured to establish, after the instruction by the second instruction unit, the wireless connection with the printing apparatus that has resumed operating in the direct wireless communication mode.

3. The communication apparatus according to claim 1, further comprising a connection unit configured to establish, in a case where it is determined, based on a result of the inquiry, that the number of terminals in the wireless connection with the printing apparatus has not reached the maximum number, the wireless connection with the printing apparatus operating in the direct wireless communication mode.

4. A communication apparatus comprising:
a first inquiry unit configured to inquire, in a case where the communication apparatus receives, from a user, an instruction to establish wireless connection with a printing apparatus operating in a direct wireless communication mode, with the printing apparatus whether a number of terminals in the wireless connection with the printing apparatus has reached a maximum number, through Bluetooth® Low Energy communication;
a second inquiry unit configured to inquire, in a case where it is determined, based on a result of the inquiry by the first inquiry unit, that the number of terminals in the wireless connection with the printing apparatus has reached the maximum number, with the printing apparatus a type of a service set identifier (SSID) being used in the direct wireless communication mode, through the Bluetooth® Low Energy communication;
a first instruction unit configured to instruct, in a case where it is determined, based on a result of the inquiry by the second inquiry unit, that the type of the SSID is a predetermined type, the printing apparatus to stop operating in the direct wireless communication mode, through the Bluetooth® Low Energy communication; and a second instruction unit configured to instruct, after the instruction by the first instruction unit, the printing apparatus to start operating in the direct wireless communication mode, through the Bluetooth® Low Energy communication.

5. The communication apparatus according to claim 4, further comprising a connection unit configured to establish, after the instruction by the second instruction unit, the wireless connection with the printing apparatus that has resumed operating in the direct wireless communication mode.

6. The communication apparatus according to claim 4, further comprising a connection unit configured to establish, in a case where it is determined, based on a result of the inquiry by the first inquiry unit, that the number of terminals in the wireless connection with the printing apparatus has not reached the maximum number, the wireless connection with the printing apparatus operating in the direct wireless communication mode.

7. A control method for a communication apparatus, the control method comprising:
  inquiring, in a case where the communication apparatus receives, from a user, an instruction to establish wireless connection with a printing apparatus operating in a direct wireless communication mode, with the printing apparatus whether a number of terminals in the wireless connection with the printing apparatus has reached a maximum number, through Bluetooth® Low Energy communication;
  transmitting, in a case where it is determined, based on a result of the inquiring, that the number of the terminals in the wireless connection with the printing apparatus has reached the maximum number, a stop instruction to the printing apparatus to stop operating in the direct wireless communication mode, through the Bluetooth® Low Energy communication; and
  transmitting a start instruction, after the stop instruction is transmitted, to the printing apparatus to start operating in the direct wireless communication mode, through the Bluetooth® Low Energy communication.

8. The control method according to claim 7, further comprising establishing wireless connection between the communication apparatus and the printing apparatus that has resumed operating in the direct wireless communication mode after the start instruction is transmitted.

9. The control method according to claim 7, further comprising establishing wireless connection between the communication apparatus and the printing apparatus operating in the direct wireless communication mode in a case where it is determined, based on a result of the inquiring, that the number of terminals in the wireless connection with the printing apparatus has not reached the maximum number.

10. A control method for controlling a communication apparatus, the control method comprising:
  inquiring, in a case where the communication apparatus receives, from a user, an instruction to establish wireless connection with a printing apparatus operating in a direct wireless communication mode, with the printing apparatus whether the number of terminals in the wireless connection with the printing apparatus has reached a maximum number, through Bluetooth® Low Energy communication;
  inquiring, in a case where it is determined, based on a result of the inquiring, that the number of terminals in the wireless connection with the printing apparatus has reached the maximum number, with the printing apparatus a type of a service set identifier (SSID) being used in the direct wireless communication mode, through the Bluetooth® Low Energy communication;
  transmitting a stop instruction, in a case where it is determined, based on a result of the inquiring, that the type of the SSID is a predetermined type, to the printing apparatus to stop operating in the direct wireless communication mode, through the Bluetooth® Low Energy communication; and
  transmitting a start instruction, after the stop instruction is transmitted, to the printing apparatus to start operating in the direct wireless communication mode, through the Bluetooth® Low Energy communication.

11. The control method according to claim 10, further comprising establishing wireless connection between the communication apparatus and the printing apparatus that has resumed operating in the direct wireless communication mode after the start instruction is transmitted.

12. The control method according to claim 10, further comprising establishing wireless connection between the communication apparatus and the printing apparatus operating in the direct wireless communication mode, in a case where it is determined, based on a result of the inquiring, that the number of terminals in the wireless connection with the printing apparatus has not reached the maximum number.

* * * * *